(12) United States Patent
Ishiguro

(10) Patent No.: US 7,508,541 B2
(45) Date of Patent: Mar. 24, 2009

(54) IMAGE PROCESSING APPARATUS, IMAGE FORMING APPARATUS, AND IMAGE PROCESSING METHOD

(75) Inventor: Kazuhiro Ishiguro, Toyokawa (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 1045 days.

(21) Appl. No.: 10/099,940

(22) Filed: Mar. 19, 2002

(65) Prior Publication Data

US 2002/0135790 A1    Sep. 26, 2002

(30) Foreign Application Priority Data

Mar. 22, 2001    (JP)    ............... 2001-082599

(51) Int. Cl.
  *G06F 15/00*    (2006.01)
(52) U.S. Cl. .................. 358/1.9; 434/2.1; 434/2.99; 434/3.26; 434/3.27; 434/518
(58) Field of Classification Search .................. 358/1.9, 358/2.1, 2.99, 3.26, 3.27, 518, 530, 533, 358/532, 434
See application file for complete search history.

(56) References Cited

U.S. PATENT DOCUMENTS

| | | | | |
|---|---|---|---|---|
| 5,357,353 | A * | 10/1994 | Hirota ............... | 358/530 |
| 5,371,610 | A * | 12/1994 | Sugawa ............. | 358/434 |
| 5,444,798 | A * | 8/1995 | Enomoto et al. ...... | 382/199 |
| 5,548,415 | A * | 8/1996 | Tanaka et al. ........ | 358/462 |
| 5,805,741 | A | 9/1998 | Shinohara | |
| 6,192,152 | B1 * | 2/2001 | Funada et al. ........ | 382/199 |
| 6,198,841 | B1 * | 3/2001 | Toyama et al. ....... | 382/164 |
| 6,559,974 | B1 * | 5/2003 | Morisita ............ | 358/1.9 |
| 6,775,031 | B1 * | 8/2004 | Fujiwara ............ | 358/2.1 |
| 7,034,962 | B2 * | 4/2006 | Suzuki ............. | 358/2.1 |
| 2001/0020949 | A1 * | 9/2001 | Gong et al. .......... | 345/593 |

FOREIGN PATENT DOCUMENTS

| | | |
|---|---|---|
| JP | 08-298596 | 11/1996 |
| JP | 9270005 | 10/1997 |
| JP | 10200710 | 7/1998 |
| JP | 11-275343 | 10/1999 |
| JP | 2001-005960 | 1/2001 |
| JP | 2001-057635 | 2/2001 |

OTHER PUBLICATIONS

Notification of Reasons for Refusal issued in corresponding Japanese Patent Application No. 2001-082599, mailed May 27, 2008, and translation thereof.
Notification of Reasons for Refusal in JP 2001-082599 dated Oct. 7, 2008, and a English Translation thereof.

* cited by examiner

*Primary Examiner*—Twyler L. Haskins
*Assistant Examiner*—Michael Burleson
(74) *Attorney, Agent, or Firm*—Buchanan Ingersoll & Rooney PC

(57) ABSTRACT

An image processing apparatus having a first area judgment unit for judging whether an inputted pixel is an edge pixel of a character image, a second area judgment unit for judging whether the pixel in a edge area having an intensity variation level equal to, or grater than an intensity variation level of a halftone image edge area, a natural image edge selection unit for specifying an edge pixel of a halftone image based on judgments of the first area judgment unit and second area judgment unit, and a first correction unit for conduction edge enhancement processing on edge pixels of a character image, and a second correction processing unit for conducting sharpness enhancement processing on edge pixels of a halftone image.

11 Claims, 11 Drawing Sheets

IMAGE PROCESSING APPARATUS, IMAGE FORMING APPARATUS, AND IMAGE PROCESSING METHOD

This application is based on an application No. 2001-082599 filed in Japan, the contents of which are hereby incorporated by reference.

BACKGROUND OF THE INVENTION (1) Field of the Invention

The present invention relates to an image processing apparatus, an image forming apparatus, and an image processing method, and especially to an edge processing technique.

(2) Description of the Related Art

In practice employed in an image forming apparatus such as a digital color copier, an original image obtaining by reading a document is subjected to so-called edge enhancement processing in order to increase the density of edge areas (for example, boundaries between a character image and a background image) before such an image is formed on a recording sheet. Such edge enhancement processing is carried out by an image processing apparatus installed in an image forming apparatus in order to sharpen boundaries and thus to improve visibility of, for example, characters by widening the difference in density between edge areas and background.

A conventional image processing apparatus calculates the degree of variations in intensity (density) between a target pixel, i.e., a pixel currently subjected to processing, and pixels surrounding the target pixel. The target pixel is judged to be in an edge area when the calculation results in a value equal to, or greater than a predetermined threshold value. Each pixel judged to be in an edge area is processed so as to increase or decrease the density.

This processing sharpens a boundary between a character image and a background image, so that the character image becomes more legible.

Incidentally, recent development in reprography technology has resulted in higher-resolutions employed both at a reading end and output-end, which raises the following problem. When reading and outputting an image at high-resolution, an edge area of halftone image, such as a black outline against a gray background appears poorly in contrast. One specific example is an image of a black hair against the background of a dark-haired head highlighted under illumination.

When reading and outputting an image at relatively low-resolution, in most cases, the background image and the hair is properly distinguished and separated without loss of contrast. Now, as higher-resolutions become available, quality of the sort of images as described above has now started to be checked more severely.

The above-mentioned problem is ascribable to that a document image is reproduced too faithfully when processed at higher-resolutions. Owing to characteristics of human visual system, such type of images appear higher quality to human eyes, if edge areas (outlines) as above are enhanced (corrected) in some degree to be more prominent.

A conventional image processing apparatus, however, dose not determine pixels in outline areas of a halftone image as edge pixels because an intensity of such a pixel does not differ so greatly from the surrounding pixels. In addition, although a conventional image processing apparatus manages to judge such pixels as edge pixels, the problem remains unsolved. If edge pixels of a halftone image are subjected to similar enhancement processing the one for edge areas of a character image, the halftone edge areas are excessively enhanced, and thus the resulting image appears awkward, which only ends up in image quality reduction.

SUMMARY OF THE INVENTION

In view of the above problems, a first object of the present invention is to provide an image processing apparatus capable of properly processing edge areas of a halftone image, such as a human hair, in addition to edge areas, such as character edge areas, where variations in intensity are large between an object and its background.

A second object of the present invention is to provide an image forming apparatus employing such an image processing apparatus as mentioned above.

A third object of the present invention is to provide an image processing method for properly processing edge areas of a halftone image, such as a human hair, in addition to edge areas, such as character edge areas, where variations in intensity are large between an object and its background.

The first object described above is achieved by an image processing apparatus for correcting data of each pixel in an edge area, comprising: a first judgment unit for judging whether a target pixel is in a first edge area; a second judgment unit for judging whether the target pixel is in a second edge area having a lower intensity variation level than the first edge area; a first correction unit for conducting first correction processing on data of each pixel that is judged by the first judgment unit to be in the first edge area; and a second correction unit for conducting second correction processing on data of each pixel that is judged by the second judgment unit to be in the second edge area.

The second object described above is achieved by an image forming apparatus, comprising: a first judgment unit for judging whether a target pixel is in a first edge area; a second judgment unit for judging whether the target pixel is in a second edge area having a lower intensity variation level than the first edge area; a first correction unit for conducting first correction processing on data of each pixel that is judged by the first judgment unit to be in the first edge area; a second correction unit for conducting second correction processing on data of each pixel that is judged by the second judgment unit to be in the second edge area; and an image forming unit for forming an image based on the data corrected by the first correction unit and the second correction unit.

The third object described above is achieved by an image processing method for correcting image data corresponding to an edge area, comprising steps of: judging (a) whether a target pixel is in a first edge area, and (b) whether the target pixel is in a second edge area having a lower intensity variation level than the second edge area; and conducting (a) first correction processing on data of the target pixel that is judged to be in the first edge area, and (b) second correction processing on the target pixel that is judged to be in the second edge area.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Hereinafter, description is given to preferred embodiments of the present invention with reference to the drawings.

Embodiment 1

Figure 1:
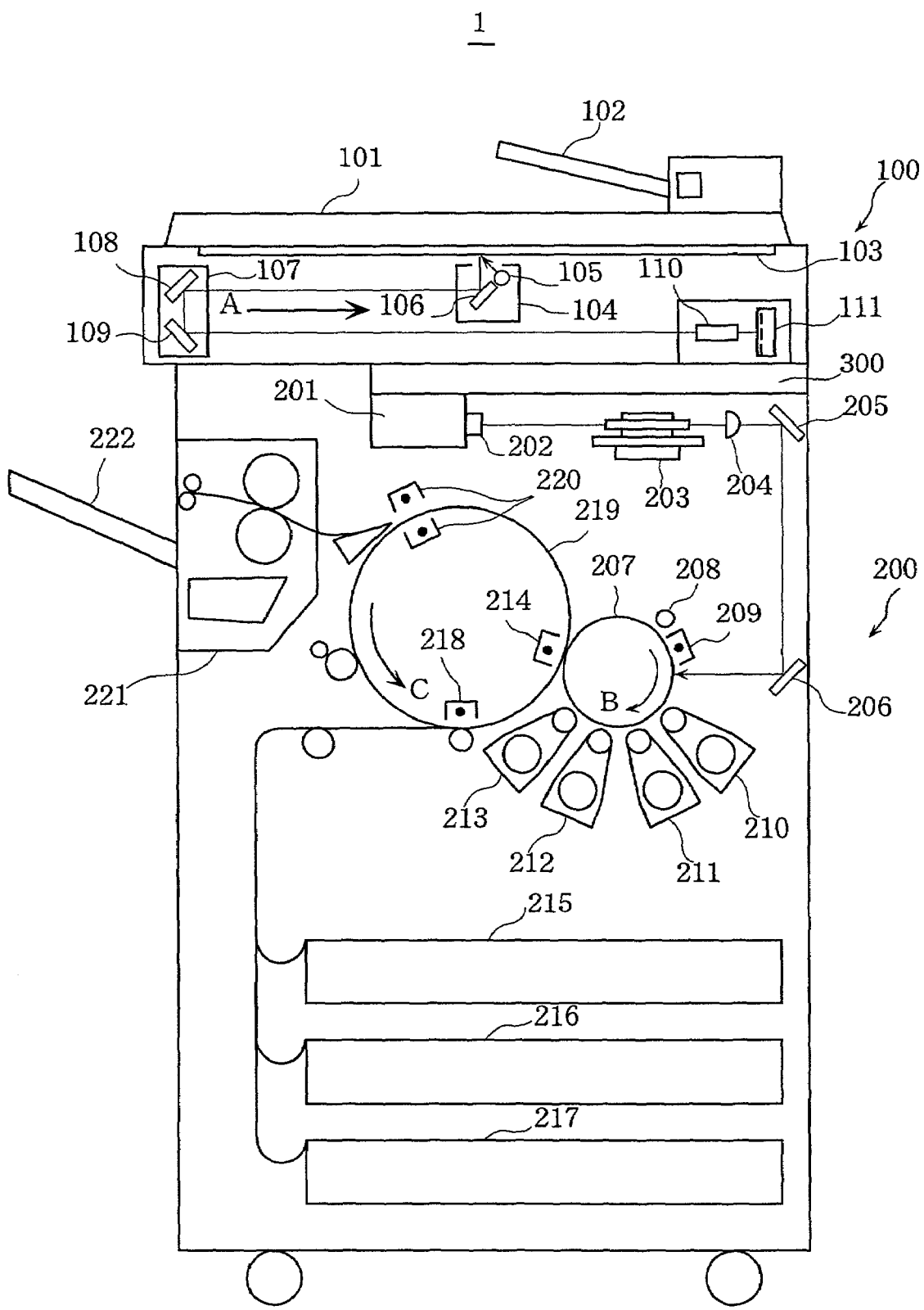
FIG. 1 is a view schematically depicting the overall construction of a digital color copier.

FIG. 1 is a view schematically depicting the construction of a digital color copier (hereinafter, referred to simply as "a copier") 1 according to an embodiment 1 of the present invention.

As shown in the figure, the copier 1 is broadly constructed of an image reader unit 100 for reading a document image, and a printer unit 200 for printing to reproduce the read image onto a recording sheet.

The image reader unit 100 includes an automatic document feeder (ADF) 101. Documents placed on a document tray 102 of the ADF 101 are fed one by one to an original glass table 103. A document fed to the original glass table 103 is exposed to light emitted from an exposure lamp 105 included in a scanner 104 that runs in a sub-scanning direction indicated in the figure by an arrow A. The light reflected off the document surface is changed its optical path as shown in the figure by a mirror 106 provided inside the scanner 104 as well as by mirrors 108 and 109 provided inside a mirror box 107 that travels in the same direction as, and at a half the speed of the scanner 104. The reflected light then forms an image on a three-line, reduction type full color CCD sensor (hereinafter, referred to simply as a "CCD sensor") 111 by passing through a lens 110. The CCD sensor 111 converts the reflected light from the document surface into analog signals of each color component, namely R (red), G (green), and B (blue). The resulting analog signals are then converted into digital data of each color component, namely, cyan, magenta, yellow, and black through processing, which will be described later, conducted by an image signal processing unit 300. The resulting digital data (image data) is then stored in an image memory (not illustrated) provided within the printer unit 200.

The image data stored in the image memory is inputted to a laser control unit 201 that is also provided within the printer unit 200. The laser control unit 201 generates a laser diode drive signal that causes a laser diode 202 to illuminate. A laser beam emitted from the laser diode 202 is deflected by a polygon mirror 203 to pass through an fθ lens 204. The laser beam is then changed its optical path successively by mirrors 205 and 206 so as to exposure-scan the surface (photosensitive surface) of a photosensitive drum 207 that rotates in the direction indicated by an arrow B.

Disposed around the photosensitive drum 207 are an eraser lamp 208, an electrostatic charger 209, toner developer units 210-213 of cyan, magenta, yellow, and black, respectively, and a transfer charger 214. Prior to being exposure-scanned as above, the photosensitive drum 207 has been irradiated by the eraser lamp 208 for diselectrification, and then uniformly charged by the electrostatic charger 209. When the uniformly electrified photosensitive surface is exposed to light, an electrostatic latent image is formed thereon. The electrostatic latent image is then developed by one of the above toner developer units as a toner image.

On the other hand, a recording sheet of a desired size is fed from one of paper feeding cassettes 215-217. By the action of an electrostatic attraction charger 218, the recording sheet is wound around (attracted to) a transfer drum 219 that rotates in the direction indicated by an arrow C. The recording sheet is then carried to a position facing the transfer charger 214 where the toner image formed on the photosensitive drum 207 is transferred onto the recording sheet by the action of the transfer charger 214.

The above process from exposure to transfer is repeated on a single recording sheet for each color of cyan, magenta, yellow, and black to form toner images of the colors being overlapped with each other, so that a color image is reproduced.

The recording sheet on which the toner image is transferred is released from the attraction to the transfer drum 219 by a separation discharging charger 220. As a result, the recording sheet is separated from the transfer drum 219, the toner image is fixed by a fixer 221, and then the recording sheet is ejected onto a tray 222.

Note that in the case of reproducing a black-and-white image (monochrome copy), the above process from exposure to transfer is carried out only for a black toner image. Further, provided at the top of the copier 1 is a control panel (not illustrated) which receives operator's instructions as to the number of copies, the size of recording sheets, and zoom ratios, for instance.

Figure 2:
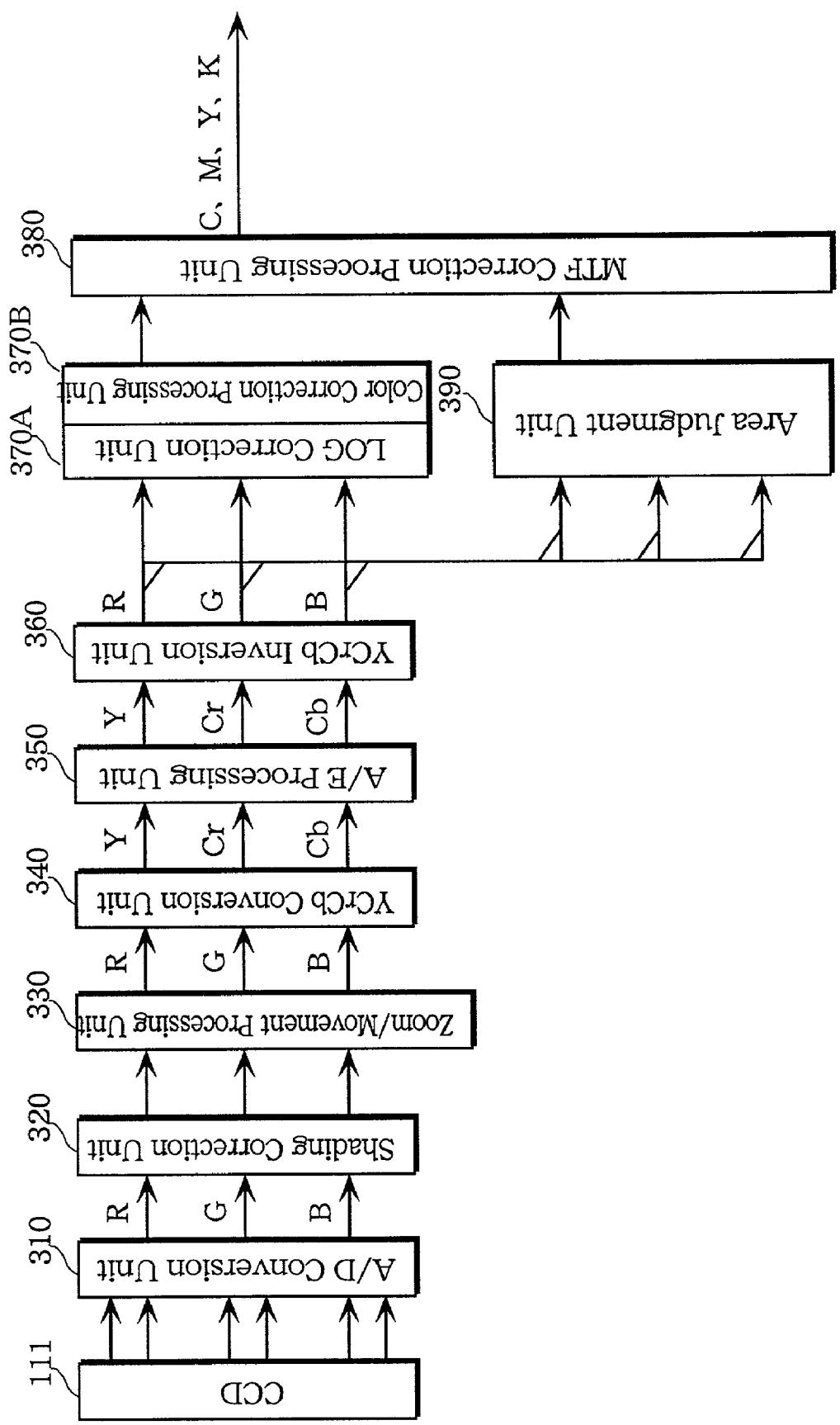
FIG. 2 is a block diagram depicting an image signal processing unit.

FIG. 2 is a block diagram depicting the image signal processing unit 300.

Analog signals obtained through photoelectric conversion performed by the CCD sensor 111 are converted by an A/D conversion unit 310 to multivalued digital image data of R, G, and B. The image data is corrected by a shading correction unit 320 in a manner to eliminate density variations among pixels caused by the CCD sensor 111 as well as variations in reading due to uneven exposure by the exposure lamp 105, and then inputted to a zoom/movement processing unit 330.

The inputted RGB image data is processed by the zoom/movement processing unit 330 for enlarging or reducing the image and/or shifting the image in accordance with the received user instructions. The resulting data is then outputted to a YCrCb conversion unit 340.

The RGB data outputted from the zoom/movement processing unit 330 is subjected to representative color system conversion by the YCrCb conversion unit 340 to generate Y (lightness) data and Cr and Cb (color component) data. The converted YCrCb image data is inputted to an AE (auto exposure) processing unit 350.

The AE processing unit 350 judges whether the document read is monochrome or color based on the inputted YCrCb image data, and appropriately adjusts a under color to prevent a see-through image or fogging of background.

After the under color adjustment, the YCrCb image data is converted back to RGB image data by a YCrCb inversion unit 360, and inputted to an LOG correction unit 370A and a color correction processing unit 370B.

The LOG correction unit 370A converts the inputted RGB image data serving as luminance data to density data of Y (yellow), M (magenta), and C (cyan), which are the colors of toners. On the other hand, the color correction processing unit 370B generates density data of K (black) by conducting UCR (under color removal) processing or BP (black paint) processing on the density data. Note that density data is expressed in 256 (0-255) gradation levels.

The CMYK image data serving as density data is subjected to edge enhancement processing, which will be described later, by an MTF (Modulation Transfer Function) correction processing unit 380, and then outputted to the printer unit 200.

On the other hand, the RGB image data outputted from the YCrCb inversion unit 360 is also inputted to an area judgment unit 390. The area judgment unit 390 judges based on the inputted image data whether a pixel corresponding to the data is an edge pixel.

Figure 3:
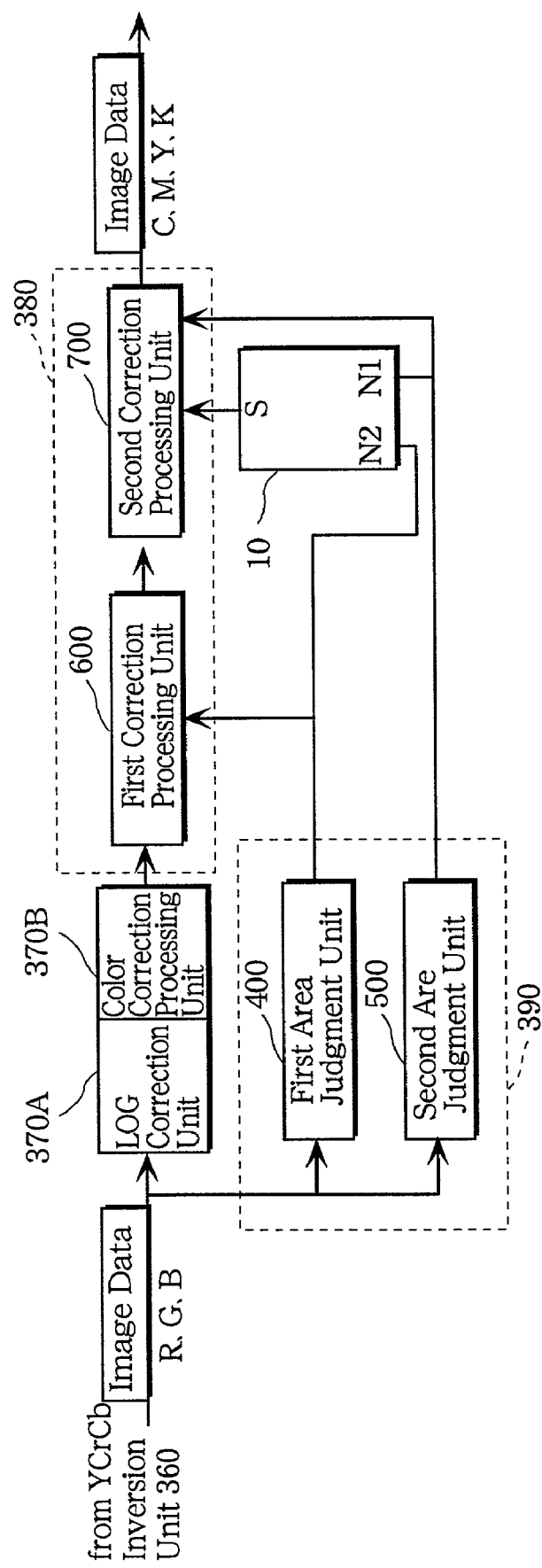
FIG. 3 is a view for illustrating the relation between an area judgment unit and a correction processing unit.

FIG. 3 is a block diagram for illustrating the relation between the area judgment unit 390 and the MTF correction processing unit 380.

As shown in the figure, the area judgment unit 390 is constructed of a first area judgment unit 400 and a second area judgment unit 500, while the MTF correction processing unit 380 is constructed of a first correction processing unit 600 and a second correction processing unit 700.

The first area judgment unit 400 is provided in order to detect edge areas of both black characters and color characters. The first area judgment unit 400 makes judgments based on the RGB image data inputted from the YCrCb inversion unit 360 as to whether a pixel corresponding to the RGB image data is a character edge pixel, and then outputs a judgment result to the first correction processing unit 600.

The first correction processing unit 600 outputs the CMYK image data that is inputted from the color correction processing unit 370B. Prior to the output, the first correction processing unit 600 conducts edge enhancement processing, which will be described later, on the data, from among the inputted CMYK image data, that corresponds to pixels judged to be character edge pixels.

The second area judgment unit 500 is provided in order to detect edge areas of an image having a halftone area (hereinafter such an image is referred to as a "natural image"), such as a photograph, where difference of an edge pixel density (intensity) with surrounding pixels is not so great in comparison with a character edge pixel. Based on the RGB image data inputted from the YCrCb inversion unit 360, the second area judgment unit 500 makes a judgment in a later described manner as to whether difference in intensity of a corresponding pixel with background pixels (surrounding pixels) is equal to, or greater than that of a natural image edge pixel. The judgment result is inputted to a natural image edge selection unit 10 through one of its input terminals, an input terminal N1.

Inputted through its other input terminal N2 to the natural image edge selection unit 10 is the judgment result made by the first area judgment unit 400. With reference to the two judgment results inputted thereto, the natural image edge selection unit 10 determines whether the target pixel is a natural image edge pixel. Only when the second area judgment unit 500 judges the target pixel is a natural image edge pixel (there is a difference in intensity that is equal to, or greater than a difference exits in the case of a natural image edge pixel), and yet the first area judgment unit 400 judges that the target pixel is not a character edge pixel, the natural image edge selection unit 10 notifies (outputs) to the second correction processing unit 700 that the target pixel is a natural image edge pixel.

The second correction processing unit 700 outputs the CMYK image data that is inputted from the color correction processing unit 370B via the first correction processing unit 600. Prior to the output, the second correction processing unit 700 conducts sharpness enhancement processing, which will be described later, on the data, from among the inputted CMYK image data, that corresponds to pixels notified by the natural image edge selection unit 10 as natural image edge pixels.

To sum up the above abbreviated description, the CMYK image data inputted from the color correction processing unit 370B is corrected through edge enhancement processing by the first correction processing unit 600 when a pixel corresponding to the CMYK image data is determined by the first area judgment unit 400 to be a character edge pixel, while it is corrected though sharpness enhancement processing by the second correction processing unit 700 when the pixel is judged to be a natural image edge pixel.

Next, description is given in detail to the first area judgment unit 400, the first correction processing unit 600, the second area judgment unit 500, and the second correction processing unit 700.

Figure 4:
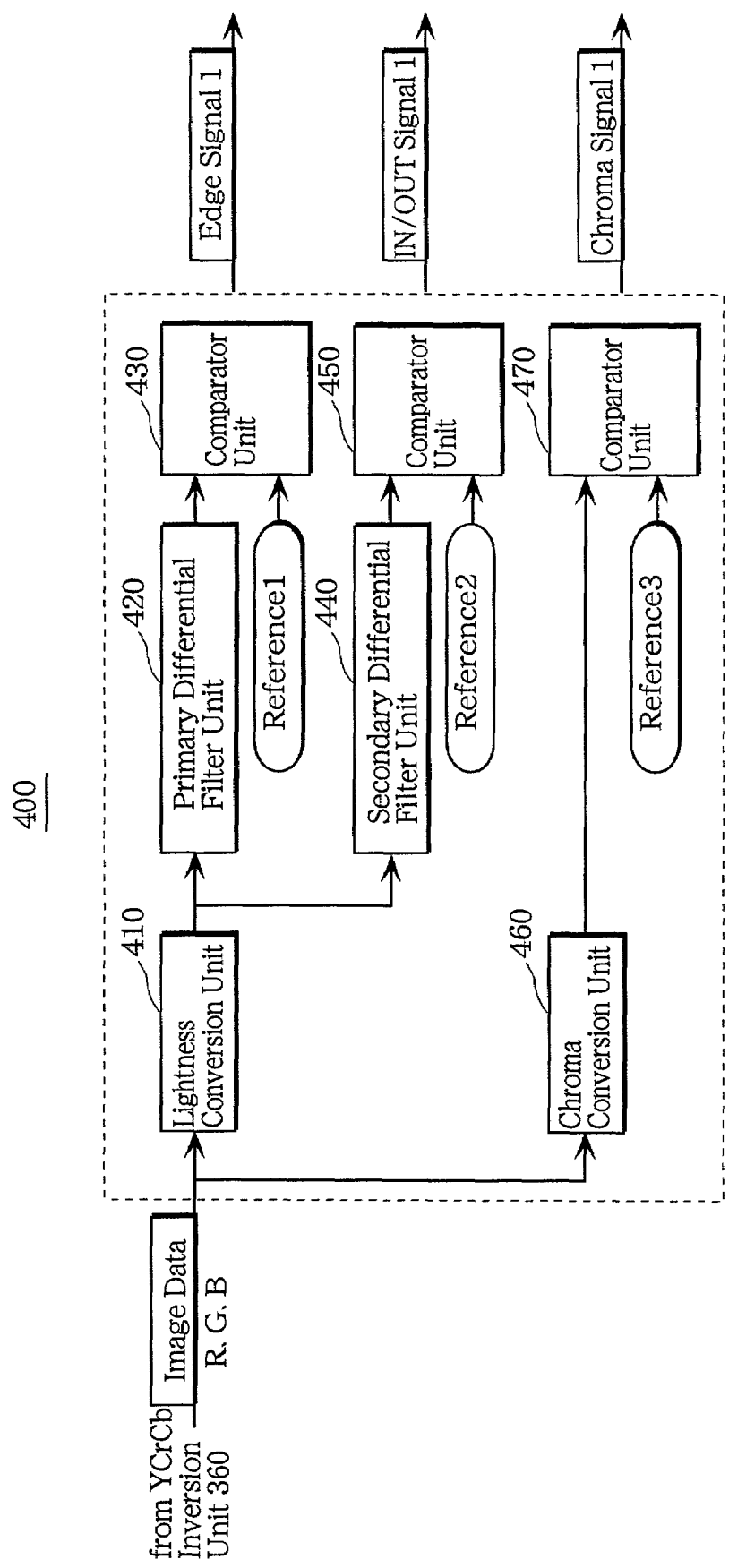
FIG. 4 is a block diagram depicting a first area judgment unit.

FIG. 4 is a block diagram depicting the first area judgment unit 400.

As shown in the figure, the first area judgment unit 400 includes a lightness conversion unit 410. The lightness conversion unit 410 calculates lightness (V) data through representative color system conversion of the RGB image data inputted from the YCrCb inversion unit 360, and then outputs the calculation result to a primary differential filter unit 420 and a secondary differential filter unit 440.

The primary differential filter unit 420 calculates, with employing a conventionally known primary differential filter, a differentiation value of the lightness data of the target pixel, that is, variations in intensity of the target pixel in relation to the surrounding pixels. The value resulting from differentiation is inputted to a comparator unit 430 through one of its input terminals.

Inputted to the comparator unit 430 through its other input terminal is a reference value which is denoted as "Reference 1". The comparator unit 430 compares the inputted differentiation value and Reference 1 to see which is grater, and outputs an edge signal 1 in accordance with the comparison result. When the differentiation value is equal to, or greater than Reference 1, the comparator unit 430 outputs the edge signal 1 at H-level, and otherwise outputs the edge signal 1 at L-level. That is to say, the edge signal 1 is outputted at H-level when the target pixel is an edge pixel, and otherwise the edge signal 1 is outputted at L-level. Note that Reference 1 is set to such a value to detect an edge area, such as an edge area of a black character or a color character, where the difference in intensity (lightness) between the object image and the background image is relatively large.

The secondary differential filter unit 440 calculates, with employing a conventionally known secondary differential filter, a differential value of the lightness data of the target pixel, and inputs the value resulting from differentiation to a comparator unit 450 through one of its input terminals.

Inputted to the comparator unit 450 through its other input terminal is a reference value which is denoted as "Reference 2". The comparator unit 450 compares the inputted differentiation value and Reference 2 to judge whether the target pixel is an inner edge pixel or an outer edge pixel, and outputs an IN/OUT signal 1 in accordance with the judgment result. Here, the terms "inner edge pixel" and "outer edge pixel" both referrer to a pixel within an edge area where the density sharply varies from low to high (from high lightness to low lightness). Specifically, the inner edge pixel resides within an edge area on the side where the density is relatively high, while the outer edge pixel resides on the other side where the density is relatively low. The comparator unit 450 outputs the IN/OUT signal 1 at H-level when the target pixel is an inner edge pixel, and outputs the IN/OUT signal 1 at L-level when the target pixel is an outer edge pixel.

In addition, the first area judgment unit 400 includes a chroma conversion unit 460. The chroma conversion unit 460 calculates a chroma (C) value through representative color system conversion of the RGB image data inputted from the YCrCb inversion unit 360, and then outputs the calculation result to a comparator unit 470 through one of its input terminals.

Inputted to the comparator unit 470 through its other input terminal is a reference value which is denoted as "Reference 3". The comparator unit 470 compares the inputted chroma value and Reference 3 to see which is greater, and outputs a chroma signal 1 in accordance with the comparison result. When the chroma value is less than Reference 3, the comparator unit 470 outputs the chroma signal 1 at H-level, and when the chroma value is equal to, or greater than Reference 3, the comparator unit 470 outputs the chroma signal at L-level. That is to say, the chroma signal 1 is outputted at H-level when the target pixel is regarded to be a black pixel, and the chroma signal is outputted at L-level when the target pixel is regarded to be a color pixel.

The above described edge signal 1, IN/OUT signal 1, and chroma signal 1 are inputted to the first correction processing unit 600. In addition, the edge signal 1 is also inputted to the natural image edge selection unit 10 through its input terminal N2 (FIG. 3).

Figure 5:
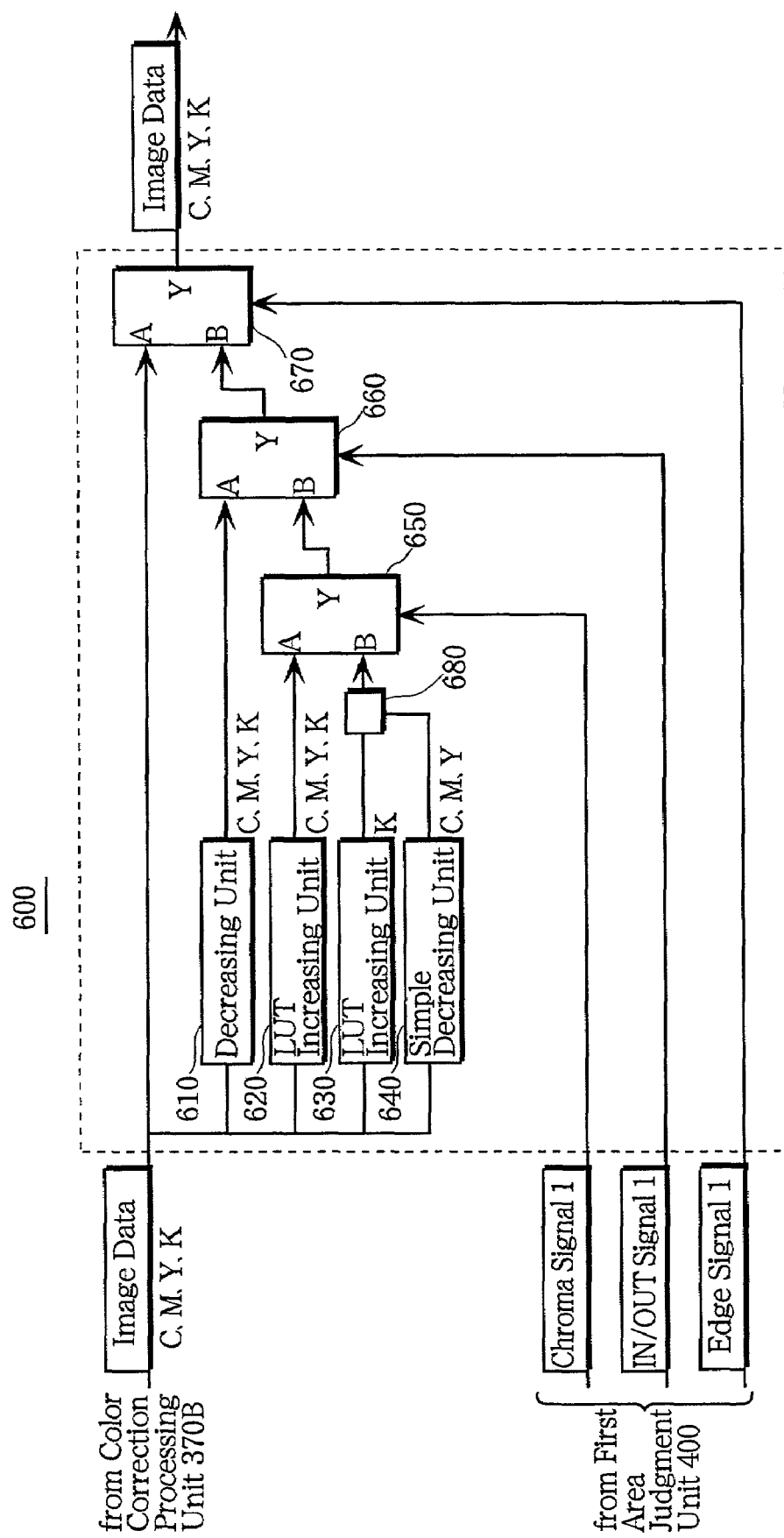
FIG. 5 is a block diagram depicting a first correction processing unit.

FIG. 5 is a block diagram depicting the first correction processing unit 600.

As shown in FIG. 5, the CMYK image data outputted from the color correction processing unit 370B (FIG. 3) is inputted to a decreasing unit 610, an LUT increasing unit 620, an LUT increasing unit 630, and a simple decreasing unit 640. Each unit mentioned above conducts later-described correction processing on the data of some, or all of the four color components, and then outputs the resulting data to the selectors 650, 660, and 670 arranged in the following stages through their corresponding input terminals. Further, the selectors 650, 660, and 670 receive from the first area judgment unit 400 the chroma signal 1, the IN/OUT signal 1, and the edge signal 1, respectively. In accordance with the inputted signal, each of the selectors 650, 660, and 670 selectively outputs either of the two kinds of image data inputted through their two input terminals.

The LUT increasing unit 630 and the simple decreasing unit 640 process every pixel in order to output corrected data that is to be used in the event that each pixel is judged to be an inner edge pixel of a black character image.

Figure 6:
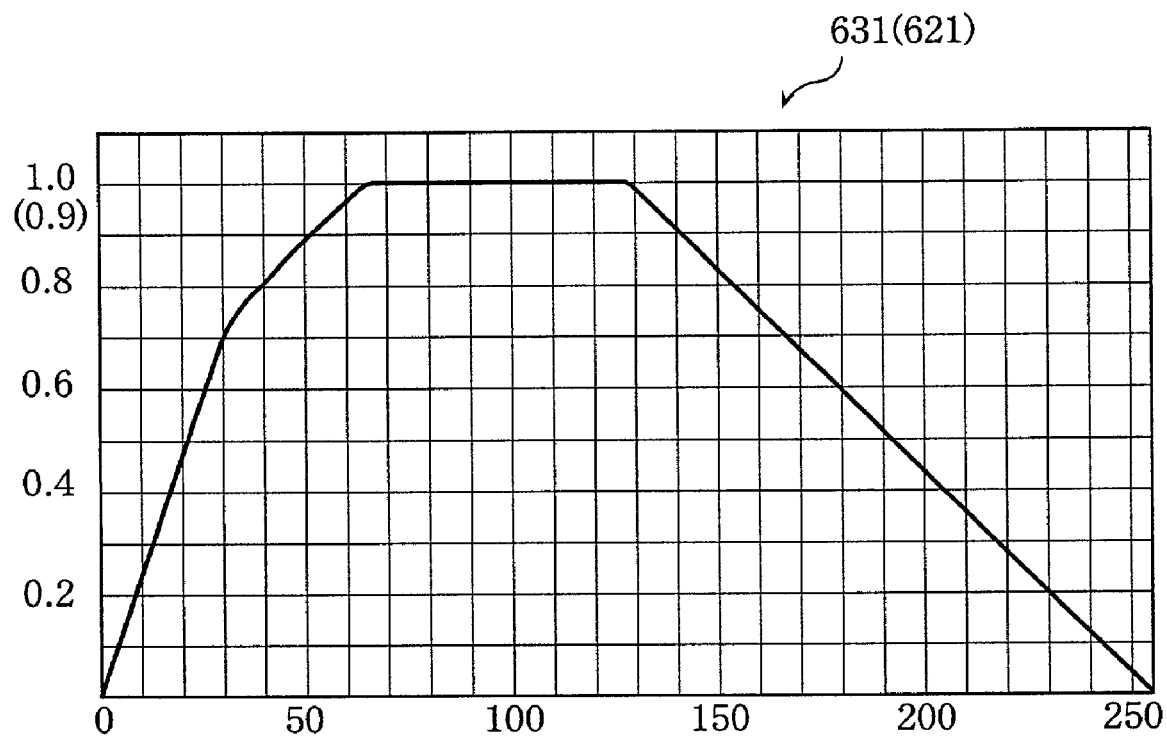
FIG. 6 is a view depicting a look-up table used to increase the density of an inner edge pixel.

The LUT increasing unit 630 includes a look-up table 631 as shown in FIG. 6. With reference to the look-up table 631, the LUT increasing unit 630 conducts processing on K data out of the four color components of the inputted CMYK image data to increase the density, and outputs the resulting K data. The horizontal axis of the look-up table 631 corresponds to density values expressed in 256 gradation levels, while the vertical axis corresponds to increase-coefficients ranging from 0 to 1.0 inclusive. Further, the curve having a substantially trapezoidal shape is referred to as a correction curve. The LUT increasing unit 630 refers to the look-up table 631 by the inputted density value to determine an increase coefficient, and multiplies the inputted density value by the increase-coefficient to calculate an amount to be increased. The LUT increasing unit 630 then calculates the sum of the inputted density data and the amount to be increased, and outputs the sum as a corrected density. For example, when the density value of 50 is inputted, the increase-coefficient is determined as 0.9 by reference to the look-up table 631. By calculation, the amount to be increased is determined to be 45 (=50×0.9), and thus the corrected density is determined to be 95 (=50+45). Note that the upper limit of the corrected density is 255. As apparent from the look-up table 631, the density after correction almost uniformly falls in one value of 255 after the inputted density value exceeds 130 or so. That is to say, the higher the inputted density value is, the smaller the increment becomes. This is because the LUT increasing unit 630 is provided in order to improve visibility of characters. To meet this end, it is not necessary to excessively increase the density of a pixel corresponding to an inputted density value that is already high. The LUT increasing unit 630 is rather set such that the inputted value of a low density pixel is increased by a greater increment than that of a high density pixel.

The simple decreasing unit 640 conducts processing separately on C data, M data, and Y data out of the four color components of the inputted CMYK image data to reduce their densities. In the reducing processing, each density value inputted is multiplied by 0.1 to obtain a corrected density. In this way, the inputted density values of chromatic color components (C, M and Y data) are corrected to extremely small values. This aims to improve the visibility of black characters.

The corrected K data outputted from the LUT increasing unit 630 as well as the corrected C, M, and Y data outputted from the simple decreasing unit 640 are inputted to a coupling unit 680. The coupling unit 680 inputs, to the selector 650 through its input terminal B, the K data and the C, M, and Y data in association.

The LUT increasing unit 620 processes every pixel in order to output corrected data that is to be used in the event that each pixel is judged to be an inner edge pixel of a color character. The LUT increasing unit 620 includes a look-up table 621 similar to the look-up table 631 shown in FIG. 6. With reference to the look-up table 621, the LUT increasing unit 620 conducts processing separately on C, M, and Y data out of the four color components of the inputted CMYK image data to increase their densities. The LUT increasing unit 620 then outputs the resulting C, M, Y data along with the K data which is left uncorrected. Here, this increase processing is similar to the increasing processing conducted by the LUT increasing unit 630, and thus description thereof is omitted. The reason for conducting the increase processing on C data, M data, and Y data but not on K data is because this processing aims to improve the visibility of color characters. The image data of each color component outputted from the LUT increasing unit 620 is inputted to the selector 650 through its input terminal A.

Also inputted to the selector 650 is the chroma signal 1. In accordance with the inputted chroma signal 1, the selector 650 selectively outputs corresponding image data through its output terminal Y. Specifically, when the inputted chroma signal 1 is at H-level, which indicates that the target pixel is judged to be a black pixel, the selector 650 outputs the image data that is inputted through its input terminal B, i.e., the image data corrected suitably for an inner edge pixel of a black character. On the other hand, when the inputted chroma signal 1 is at L-level, which indicates that the target pixel is judged to be a color pixel, the selector 650 outputs the image data that is inputted through its input terminal A, i.e., the image data corrected suitably for an inner edge pixel of a color character.

The image data outputted from the selector 650 is inputted to the selector 650 through an input terminal B, one of its two input terminals. Also inputted to the selector 650 thought its other input terminal A is the image data outputted from the decreasing unit 610.

Figure 7:
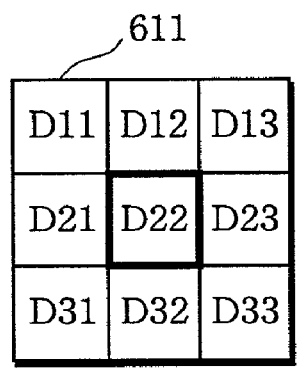
FIG. 7 is a view depicting a MIN filter used to decrease the density of an outer edge pixel.

The decreasing unit 610 is provided in order to conduct processing on outer edge pixels of characters regardless of black characters or color characters. The decreasing unit 610 decreases inputted density values using a 3-by-3 MIN filter 611 as shown in FIG. 7. Specifically, when processing a target pixel $D_{22}$, the MIN filter 611 first detects a pixel having the smallest density value among pixels residing within the 3-by-3 pixel range, i.e., among the target pixel and the surrounding pixels that are one row blow and above (in the sub-scanning direction), and one column right and left (in the main scanning direction) to the target pixel. The MIN filter 611 then replaces the density value of the target pixel D22 with the thus detected smallest density value. The effect of this processing is equal to that the density of the target pixel $D_{22}$ is decreased by the difference with the smallest density value detected in the 3-by-3 pixel range. The corrected density outputted from the decreasing unit 610 is inputted to the selector 660 through its input terminal A.

Also inputted to the selector 660 is the IN/OUT signal 1. In accordance with the inputted IN/OUT signal 1, the selector 660 selectively outputs corresponding image data through its output terminal Y. Specifically, when the inputted IN/OUT signal 1 is at H-level, which indicates that the target pixel is judged to be an inner edge pixel of a character image, the selector 660 outputs the image data that is inputted though its input terminal B, i.e., the image data corrected suitably for an inner edge pixel of a character image. On the other hand, when the inputted IN/OUT signal is at L-level, which indicate that the target pixel is judged to be an outer edge pixel of a character image, the selector 660 outputs the image data that is inputted through its input terminal A, i.e., the image data corrected suitably for an outer edge pixel of a character image.

The image data outputted from the selector 660 is inputted to the selector 670 though an input terminal B, one of its input terminals. Also inputted to the selector 670 through its other input terminal A is the CMYK image data as it is outputted from the color correction processing unit 370.

Also inputted to the selector 670 is the edge signal 1. In accordance with the inputted edge signal 1, the selector 670 selectively outputs corresponding image data through its output terminal Y. Specifically, when the inputted edge signal 1 is at H-level, which indicates that the target pixel is judged to be a character edge pixel, the selector 670 outputs the image data that is inputted though its input terminal B, i.e., the image data corrected suitably for an edge pixel (either for an inner edge pixel or an outer edge pixel). On the other hand, when the inputted edge signal 1 is at L-level, which indicates that the target pixel is judged to be a pixel other than an edge pixel, the selector 670 outputs the image data that is inputted through its input terminal A, i.e., the image data remain uncorrected as inputted from the color correction processing unit 370B.

The above-described processing by the first area judgment unit 400 and the first correction unit processing unit 600 is summarized as follows. Pixels judged to be inner edge pixels of a black character are increased in K component density, and decreased in C, M, and Y component densities. On the other hand, pixels judged to be inner edge pixels of a color character are increased in C, M, and Y component densities. Pixels judged to be outer edge pixels of a character are decreased in all the C, M, Y, and K component densities regardless of the character is a black or color character. Finally, pixels judged to be pixels other than edge pixels are left uncorrected by the first correction processing unit 600, and inputted as they are to the second correction processing unit 700, which follows.

Next, description is given in detail to the second correction processing unit 700 and the second area judgment unit 500.

Figure 8:
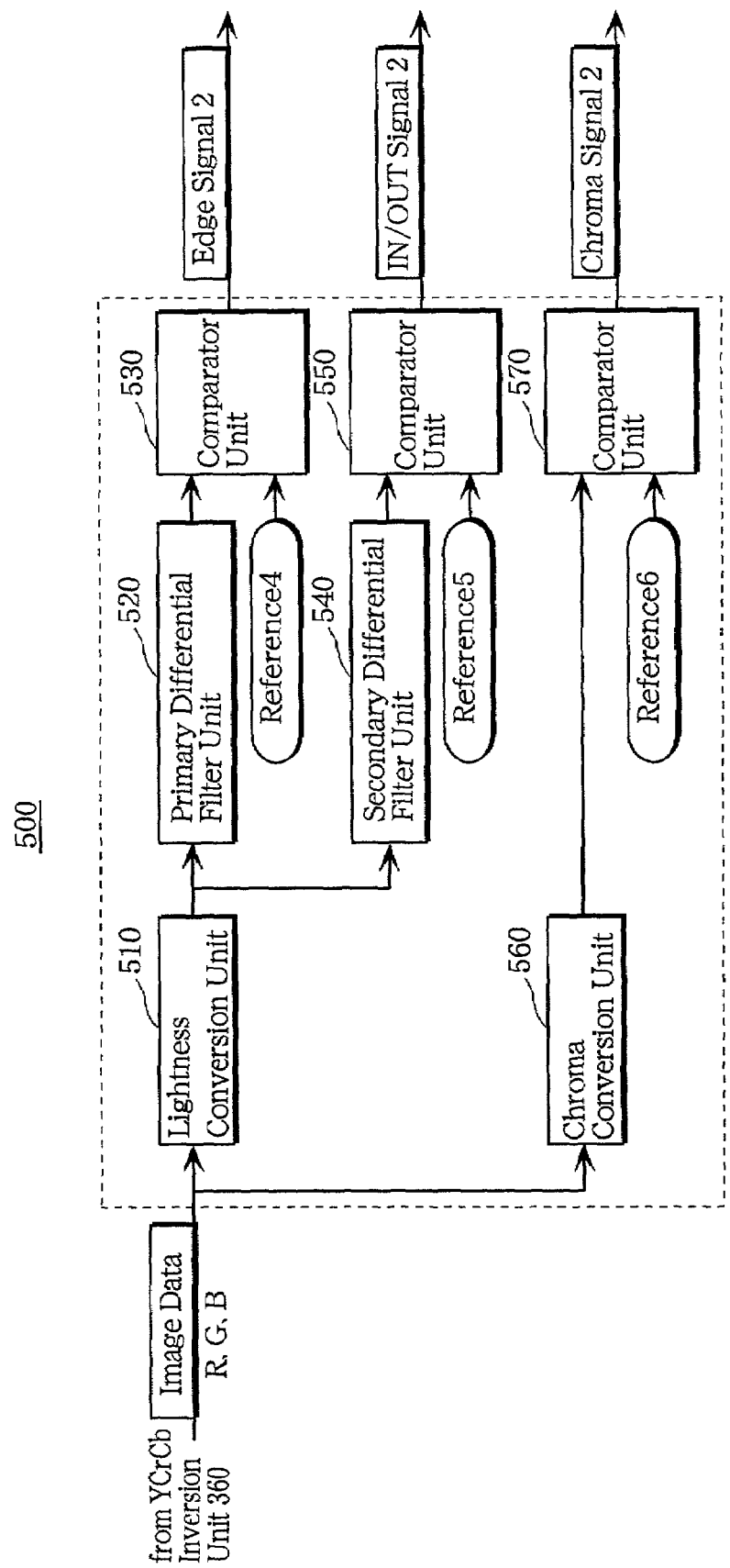
FIG. 8 is a block diagram depicting a second area judgment unit.

FIG. 8 is a block diagram depicting the second area judgment unit 500.

Components shown in this figure are basically similar to the components included in the first area judgment unit 400 shown in FIG. 4. Specifically, a lightness conversion unit 510, a primary differential filter unit 520, a comparator unit 530, a secondary differential filter unit 540, a comparator unit 550, a chroma conversion unit 560, and a comparator unit 570 are similar to those in FIG. 4 denoted by reference numerals of which last two digits match. Differences in the construction between the second area judgment unit 500 and the first area judgment unit 400 lie in the reference values inputted to the comparator units 530, 550, and 570. Consequently, description is given mainly to where the differences lie to avoid redundancy.

As already mentioned above, the second area judgment unit 500 is provided in order to detect edge areas of a natural image. To this end, "Reference 4" inputted to the comparator unit 530 is set at a value smaller than "Reference 1" (FIG. 4) inputted to the comparator unit 430, and "Reference 5" inputted to the comparator unit 550 is set at a value smaller than "Reference 2" (FIG. 4) inputted to the comparator unit 450.

By setting the two References at such values, the second area judgment unit 500 serves to detect edge areas that the first area judgment unit 400 is unable to detect. That is to say, the second area judgment unit 500 is capable of detecting edge areas (natural image edge areas) where difference in density with background images is not as large as that in the case of character edge areas.

On the other hand, "Reference 6" inputted to the comparator unit 570 is set at a value irrespective of "Reference 3" inputted to the comparator unit 470. This is because two comparator units refer to chroma values for different purposes. "Reference 6" takes on a different value depending on types of edge areas to be enhanced. For example, there is a theory that simply enhancing all the edge areas of natural images may result in degraded images. Enhancing edge areas of low chroma images, such as black hair, will improve the image quality, while enhancing edge areas of high chroma images, such as roses, will only result in awkward, degraded images. In addition, in low chroma image data, each color component in RGB data serving as luminance data is combined at almost equal intensity. Consequently, each of color components CMY in CMYK image data serving as density data is also combined at almost equal intensity. For this reason, even if the image data involves so-called random noise (phenomenon in which the balance of the three color components in RGB image data differs from that in the original document) generated at the time of reading an original, enhancement processing does not cause inconvenience of making a specific color more prominent. Based on these theories, "Reference 6" is set at a value for detecting relatively row chroma pixels.

The comparator unit 530 outputs an edge signal 2 at H-level when the differential value inputted from the primary differential filter unit 520 is equal to, or greater than "Reference 4", and otherwise outputs the edge signal 2 at L-level.

The comparator unit 550 outputs an IN/OUT signal 2 in accordance with the result of comparison between the differential value inputted from the secondary differential filter unit 540 and "Reference 5". The comparator unit 550 outputs the IN/OUT signal 2 at H-level when the target pixel is judged to be an inner edge pixel, and outputs the IN/OUT signal at L-level when the target pixel is judged to be an outer edge pixel.

The comparator unit 570 outputs a chroma signal 2 at H-level when the chroma value inputted from the chroma conversion unit 560 is less than "Reference 6", and outputs the chroma signal 2 at L-level when the chroma value is equal to, or greater than "Reference 6". That is to say, the chroma signal is at H-level when the target pixel is of relatively low chroma, and at L-level when the target pixel is of relatively high chroma.

Among the above three signals, the IN/OUT signal 2 and the chroma signal 2 are directly inputted to the second correction processing unit 700, while the edge signal 2 is inputted to the natural image edge selection unit 10 (FIG. 3), which is already described. The natural image edge selection unit 10 outputs a signal (edge signal 3) in accordance with the combination of the inputted edge signal 1 and edge signal 2. Specifically, the natural image edge selection unit 10 outputs the edge signal 3 at H-level in the event of receiving the edge signal 1 at L level and the edge signal 2 at H-level, and otherwise outputs the edge signal 3 at L-level. (Here, it goes without saying that there is no possibility of receiving the edge signal 1 at H-level along with the edge signal 2 at L-level.) That is, the edge signal 3 is outputted at H-level when the target pixel is judged to be a natural image edge pixel, while outputted at L-level when the target pixel is judge to be a pixel other than a natural image edge pixel.

Figure 9:
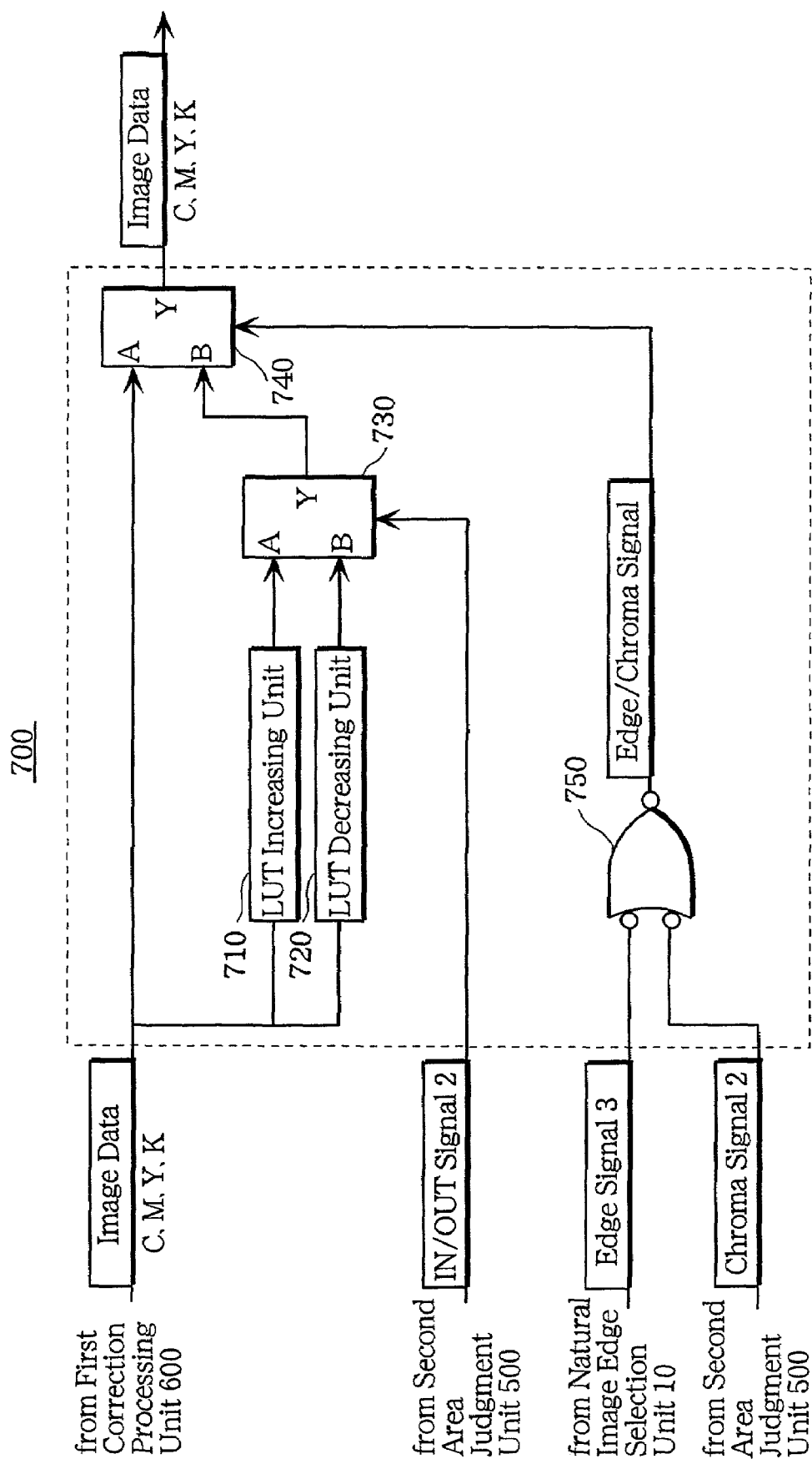
FIG. 9 is a block diagram depicting a second correction processing unit.

FIG. 9 is a block diagram depicting the second correction processing unit 700.

The CMYK image data outputted from the color correction processing unit 370B and gone through the first correction processing unit 600 (FIG. 3) is inputted, as shown in FIG. 9, to a selector 740 through a terminal A, which is one of its input terminals, as well as to an LUT increasing unit 710, and an LUT decreasing unit 720. Both the LUT increasing unit 710 and the LUT decreasing unit 720 conduct correction processing, which will be described later, on all the four color components of CMYK image data, and then output the resulting data to a selector 730 located in the following stage thought their respective input terminals.

Further, the IN/OUT signal 2 outputted from the second area judgment unit 500 is inputted to the selector 730, and the chroma signal 2 is inputted to an AND circuit 750 through one of its input terminals. Also inputted to the AND circuit 750 through its other input terminal is the edge signal 3 outputted from the natural image edge selection unit 10 (FIG. 3). The AND circuit 750 outputs a signal at H-level only in the event that the inputted chroma signal 2 and edge signal 3 are both at H-level, i.e., in the event that the target pixel is judged to be a natural image edge pixel with relatively low chroma. Otherwise, the AND circuit 750 outputs a signal at L-level. Hereinafter, the output signal of the AND circuit 750 is referred to as the "edge/chroma signal". The edge/chroma signal is inputted to the selector 740.

The LUT increasing unit 710 and the LUT decreasing unit 720 conduct edge enhancement processing on natural image edge areas having relatively low chroma. The LUT increasing unit 710 is provided in order to increase the densities of inner edge pixels, and the LUT decreasing unit 720 is provided in order to decrease the densities of outer edge pixels.

Figure 10:
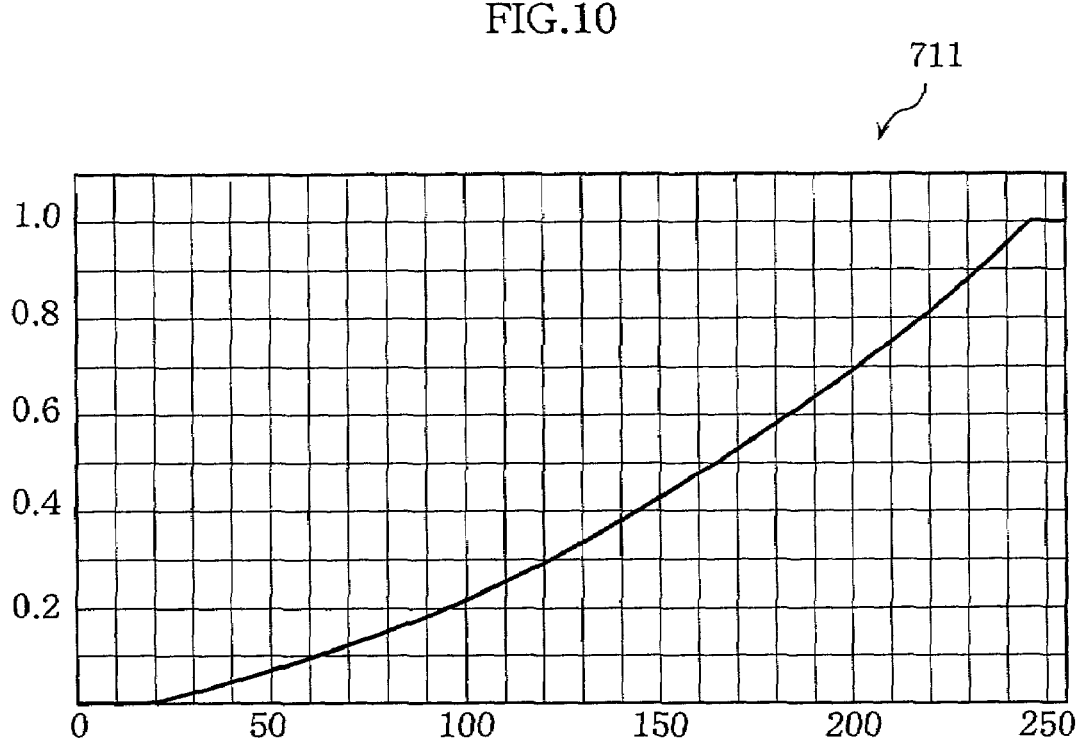
FIG. 10 is a view depicting a look-up table used to increase the density of an inner edge pixel.

The LUT increasing unit 710 includes a look-up table 711 as shown in FIG. 10. With reference to the look-up table 711, the LUT increasing unit 710 conducts processing separately on all the four color components of the inputted CMYK image data to increase their densities, and outputs the resulting data. The look-up table 711 is similar to the above-described look-up table 631 (FIG. 6) in the structure and usage except the shape of correction curve, and thus, description thereof is omitted.

As apparent from the look-up table 711, the density after correction almost uniformly falls in one value of 255 after the inputted density value exceeds 170 or so. That is to say, the higher the inputted density value is, the smaller the increment becomes. This is because the LUT increasing unit 710 is provided in order to improve sharpness of natural image edge areas. Extreme enhancement of edge areas with high densities will only make the granularity of image more noticeable. In addition, if the densities of natural image edge areas with low densities are increased excessively, the resulting image becomes even more awkward. For these reasons, the correction curve in the look-up table 711 differs from the correction curve in the look-up table 631 in that the lower the inputted density is, the smaller the increment becomes.

Figure 11:
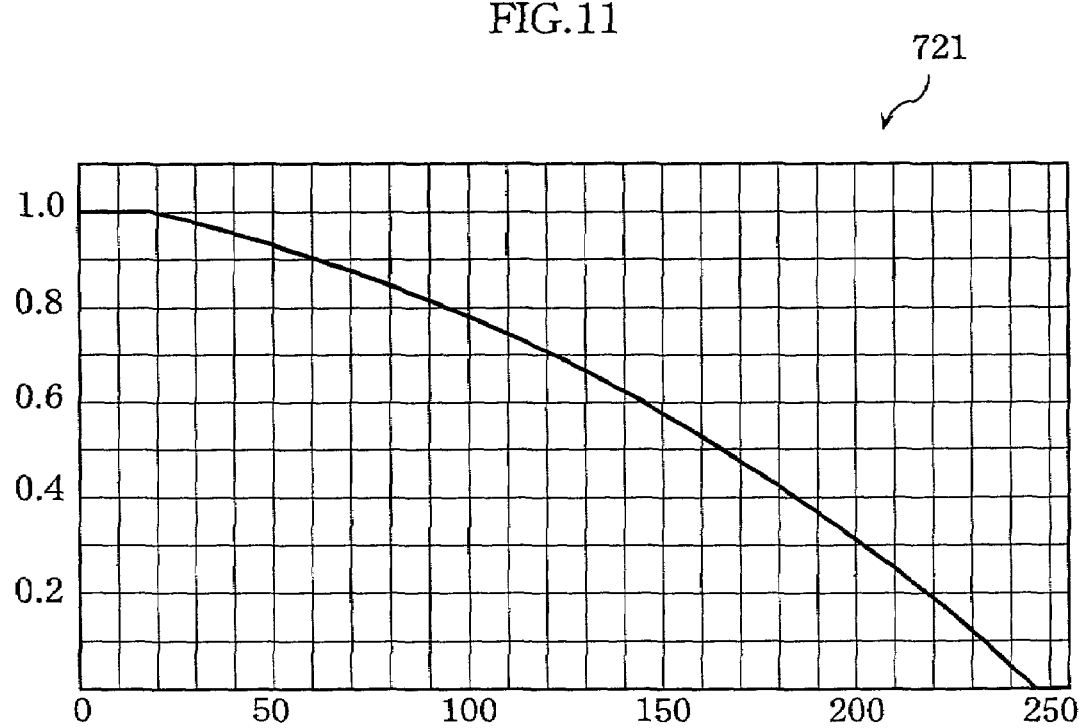
FIG. 11 is a view depicting a look-up table used to decrease the density of an outer edge pixel.

The LUT decreasing unit 720 includes a look-up table 721 as shown in FIG. 11. With reference to the look-up table 721, the LUT decreasing unit 720 conducts processing reparatory on all the four color components of the inputted CMYK image data to decrease their densities, and outputs the resulting data. That is, the LUT decreasing unit 720 refers to the look-up table 721 by the inputted density value to determine a decrease-coefficient shown by the correction curve, and multiplies the inputted density value by the decrease-coefficient to calculate an amount to be decreased. The LUT decreasing unit 720 then calculates the corrected density by subtracting the calculated decreasing amount from the inputted density value.

Further, a correction curve in the look-up table 721 used for determining an amount to be decreased in the density of an outer edge pixel has the following relation with the correction curve in the look-up table 711 used for determining an amount to be increased in the density of an inner edge pixel. That is, according to the two correction curves, the total amount to be decreased in densities of the outer edge pixels within one edge area is almost equal to the total amount to be increased in densities of the inner edge pixels within the same edge area. This is because, generally, in a document image including a natural image, natural image edge areas occupy relatively large percent of the entire image. Thus, when there is a considerable difference between the total increasing amount and the total decreasing amount, the resulting image on the whole becomes darker or lighter. The above relation between the two correction curves is set for so-called density preservation, i.e., prevention of such a lighter or darker image.

The corrected densities outputted from the LUT increasing unit 710 and the LUT decreasing unit 720 are inputted separately to the selector 730.

The selector 730 selectively outputs the corrected density that is inputted from the LUT increasing unit 710 when the inputted IN/OUT edge signal 2 is at H-level, which indicates that the target pixel is judged to be an inner edge pixel. On the other hand, when the inputted IN/OUT signal 2 is at L-level, which indicates that the target pixel is judged to be an outer edge pixel, the selector 730 outputs the corrected density that is inputted from the LUT decreasing unit 720. The corrected density that thus selected and outputted is inputted to the selector 740 through its imputer terminal B.

The selector 740 selectively outputs the corrected density that is inputted through its input terminal B when the inputted edge/chroma signal is at H-level, which indicates that the target pixel is judged to be a natural image edge area with relatively low chroma. On the other hand, when the inputted edge/chroma signal is at L-level, which indicates that the target pixel is judged to be a pixel other than the above-mentioned pixel, the selector 740 selectively outputs the density that is inputted from the first correction processing unit 600 through its input terminal A.

As described above, an image processing apparatus according to the embodiment 1 of the present invention manages to judge both (1) edge areas, such as a character edge areas, where there is a relatively large difference in intensity between the character image and the background image, and (2) edge areas, such as edge areas of a halftone image, where there is a relatively small difference in intensity between that target pixel and the background image, and to conduct correction processing (enhancement processing) that is appropriate to each type of edge areas.

Embodiment 2

In the embodiment 1 of the present invention, among natural image edge pixels, pixels with relatively low chroma are subjected to correction processing (conducted by the second area judgment unit 500 and the second correction processing unit 700). One object of this processing is to avoid negative effect of random noise.

In an embodiment 2 of the present invention, the same object is achieved by a different approach. That is, without judging chroma of a target pixel, all the natural image edge pixels are subjected to correction processing. The correction processing is conducted only on achromatic color component of K data out of the four color components of CMYK image data.

The above approach is especially effective when the random noise mentioned above is generated by electrical factors in the reading system. In the case of electrically generated noise, such noise is rarely generated in all the RGB components in the read RGB image data at the same level and at the same timing. That is to say, due to the random noise generated, the balance of the three color components RGB in the read image differs from the original image.

Such random noise remains even after the RGB data serving as lightness data is converted to CMY image data serving as density data. However, the random noise has little effect on the amount of K component (K data). The K component is generated, instead of removing equal amounts of C, M, and Y components from the CMY image data, to be equal in amount to each of the C, M, and Y components removed.

Noting the above fact, in the embodiment 2, only K data is subjected to correction processing as already mentioned. With this processing, natural images are sharpened while suppressing adverse effect of random noise.

To this end, the embodiment 2 differs from the embodiment 1 in the constructions of the second area judgment unit and the second correction processing unit. The constructions of the other components in this embodiment are the same as those in the embodiment 1. Thus, descriptions and drawings regarding those components are omitted. In addition, the components that are the same as those of the embodiment 1 are denoted by the same reference numerals.

The second area judgment unit in the embodiment 2 differs from the second area judgment unit 500 of the embodiment 1 shown in FIG. 8 in that the chroma conversion unit 560 and the comparator unit 570 are omitted. The other components of the second area judgment unit are similar to the embodiment 1, and thus description thereof is omitted. Note that, similarly to the embodiment 1, the natural image edge selection unit 10 generates the edge signal 3 from the edge signal 2 and the edge signal 1 that is generated by the first area judgment unit 400.

Figure 12:
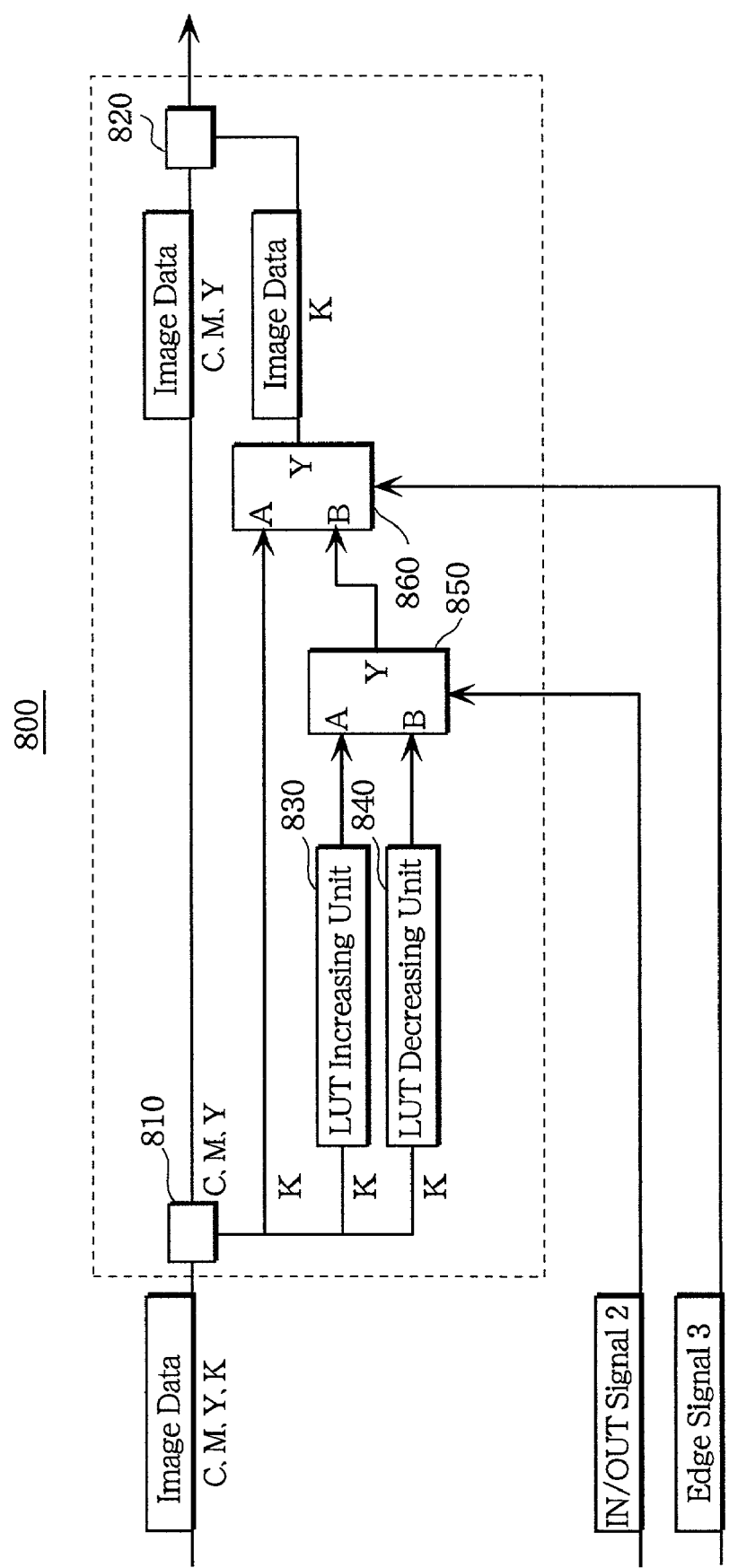
FIG. 12 is a block diagram depicting a second correction processing unit consistent with an embodiment 2.

Instead of the second correction processing unit 700 of the embodiment 1, the copier of the embodiment 2 has a second correction processing unit 800 shown in FIG. 12.

The CMYK image data outputted from the color correction processing unit 370B and gone through the first correction processing unit 600 (FIG. 3) is inputted, as shown in FIG. 12, to a separator unit 810. The separator unit 810 divides the inputted CMYK image data into each of the four color components, which are C data, M data, Y data, and K data. The separator unit 810 then inputs the C data, M data, and Y data to a coupling unit 820, and inputs the K data to a selector 860 through its input terminal A, and also to an LUT increasing unit 830 and an LUT decreasing unit 840.

Unlike the embodiment 1 in which the LUT increasing unit 710 and the LUT decreasing unit 720 (FIG. 9) conduct correction processing on the image data of all the four color components C, M, Y, and K, the LUT increasing unit 830 and the LUT decreasing unit 840 conduct correction processing only on K data. In all the other respect, the two LUT increasing units and the two LUT decreasing units are basically the same, and thus detailed description is omitted. In short, the LUT increasing unit 830 and the LUT decreasing unit 840 conduct correction processing on K data using the look-up table 711 (FIG. 10), and the look-up table 721 (FIG. 11), respectively, and separately output the corrected data to the selector 850.

The selector 850 selectively outputs the corrected density that is inputted from the LUT increasing unit 830 when the inputted IN/OUT signal 2 is at H-level, which indicates that the target pixel is judged to be an inner edge pixel. On the other hand, when the inputted IN/OUT signal 2 is at L level, which indicates that the target pixel is an outer edge pixel, the selector 850 selectively outputs the corrected density that is inputted from the LUT decreasing unit 840. In either case, the thus selected corrected density is then inputted to the selector 860 through its input terminal B.

Further, unlike the embodiment 1, the edge signal 3 is directly inputted to the selector 860. The selector 860 selectively outputs the corrected data (k data) inputted through its input terminal B when the inputted edge signal 3 is at H-level, which indicates that the target pixel is judged to be a natural image edge pixel. On the other hand, when the inputted edge signal 3 is at L-level, which indicates that the target pixel is judged to be a pixel other than a natural image edge pixel, the selector 860 selectively outputs the density data (K data) that is inputted from the first correction processing unit 600 via the separator unit 810. In either case, the thus selected density data is inputted to the coupling unit 820.

The coupling unit 820 outputs the above K data in association with C, M, Y data regarding the same target pixel.

Up to this point, the present invention has been described by way of examples. Yet, it goes without saying that the present invention is not limited to the specific embodiments described above, and various modifications such as the following are possible.

Figure 13:
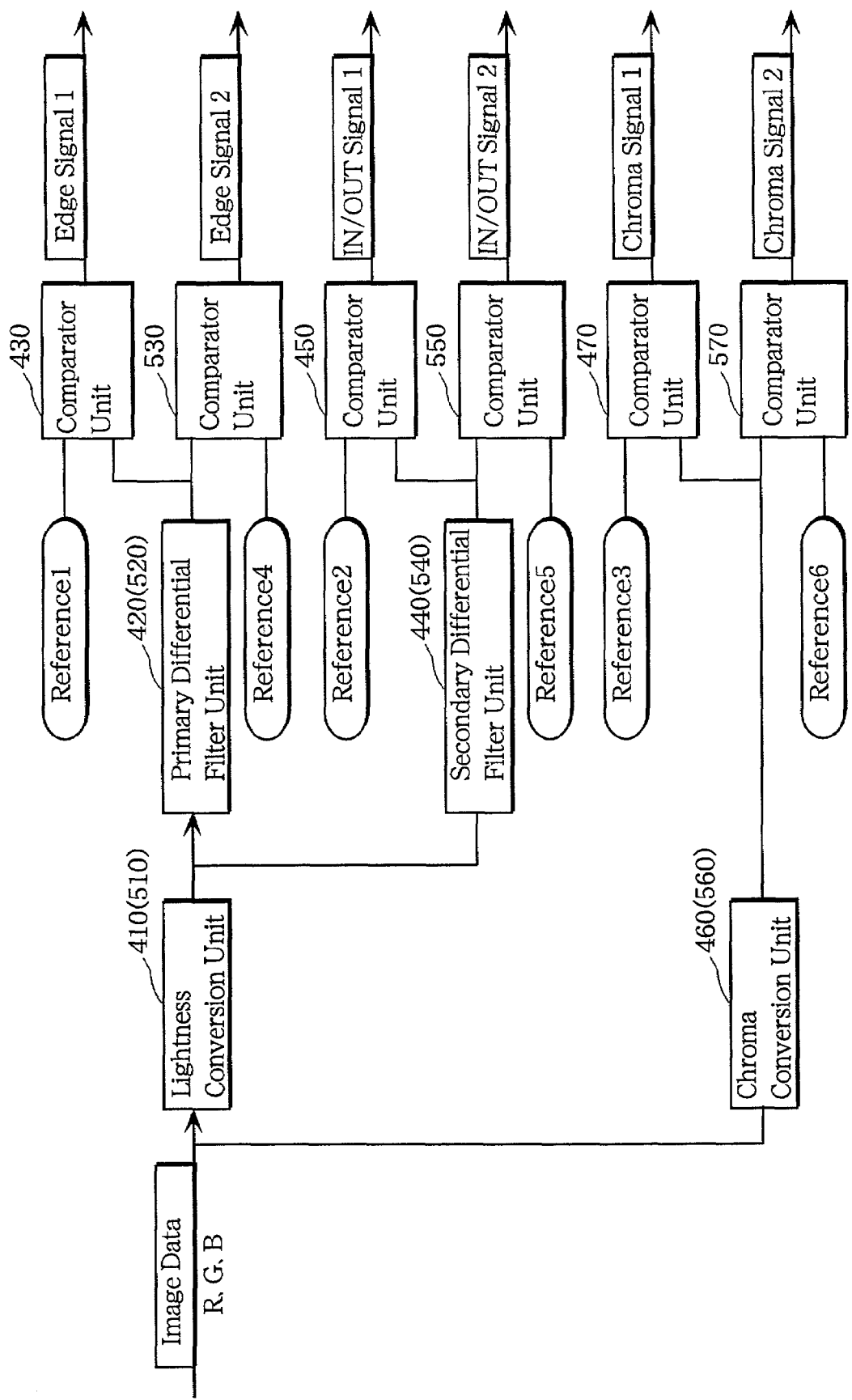
FIG. 13 is a block diagram depicting a first area judgment unit and a second area judgment unit constructed by partly sharing the components with each other.

In the embodiment 1 above, the first area judgment unit 400 (FIG. 4) and the second area judgment unit 500 (FIG. 8) are provided separately and independently. However, as described above, the two units are basically the same in construction, and differ in reference values to be inputted to each comparator unit. Thus, it is possible to configure the two units by sharing the common components with each other. FIG. 13 shows such an example. Note that the shared components in this figure are denoted by the two corresponding reference numerals.

As shown in FIG. 13, in this example, the lightness conversion unit, the primary differential filter unit, the secondary differential filter unit, and the chroma conversion unit are shard between the two units. Each of the primary differential filter, the secondary differential filter, and the chroma conversion unit are provided with separate comparators in their following stages. By sharing these components between the two units, the construction is simplified in comparison with that of the embodiment 1, which leads to reduction of manufacturing cost. Note that, when applying this modification to the embodiment 2, the comparator unit 570 shown in FIG. 13 is naturally omitted from those components to be shared.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus for correcting data of each pixel in an edge area, comprising:
    a first judgment unit for judging whether a target pixel is in a first edge area by comparing an output from a differential filter with a first reference value;
    a second judgment unit for judging whether the target pixel is in a second edge area by comparing the output from a differential filter with a second reference value that is smaller than the first reference value;
    a first correction unit for conducting first correction processing on data of each pixel that is judged by the first judgment unit to be in the first edge area;
    a second correction unit for conducting second correction processing on data of each pixel that is judged by the second judgment unit to be in the second edge area; and
    wherein the data of each pixel includes a plurality of color component data;
    the first correction unit conducts correction processing on at least one of the plurality of color component data differently from the other color component data; and
    the second correction unit conducts correction processing on all of the color component data in a same manner.

2. The image processing apparatus of claim 1, wherein
    the data includes chromatic color component data and achromatic color component data, and
    the second correction unit conducts correction processing only on the achromatic color component data.

3. The image processing apparatus of claim 1, wherein
    the data is a density value, and
    the first correction processing includes processing to increase or decrease the density value.

4. The image processing apparatus of claim 1, wherein
    the first judgment unit and the second judgment unit shares the differential filter, the differential filter outputting intensity variations among pixels surrounding the target pixel.

5. The image processing apparatus of claim 1, wherein
    the first judgment unit further judges whether the target pixel is a chromatic color pixel or a achromatic color pixel, and
    the first correction unit conducts different processing depending on whether the target pixel is a chromatic color pixel or an achromatic color pixel.

6. An image forming apparatus, comprising:
    a first judgment unit for judging whether a target pixel is in a first edge area by comparing an output from a differential filter with a first reference value;
    a second judgment unit for judging whether the target pixel is in a second edge area by comparing the output from a differential filter with a second reference value that is smaller than the first reference value;
    a first correction unit for conducting first correction processing on data of each pixel that is judged by the first judgment unit to be in the first edge area;
    a second correction unit for conducting second correction processing on data of each pixel that is judged by the second judgment unit to be in the second edge area;
    an image forming unit for forming an image based on the data corrected by the first correction unit and the second correction unit; and
    wherein the data of each pixel includes a plurality of color component data;
    the first correction unit conducts correction processing on at least one of the plurality of color component data differently from the other color component data; and
    the second correction unit conducts correction processing on all of color component data in a same manner.

7. The image forming apparatus of claim 6, wherein
    the data includes chromatic color component data and achromatic color component data, and
    the second correction unit conducts correction processing only on the achromatic color component data.

8. The image forming apparatus of claim 6, wherein
    the data is a density value, and
    the first correction processing includes processing to increase or decrease the density value.

9. The image forming apparatus of claim 6, wherein
    the first judgment unit and the second judgment unit shares the differential filter, the differential filter outputting intensity variations among pixels surrounding the target pixel.

10. The image forming apparatus of claim 6, wherein
    the first judgment unit further judges whether the target pixel is a chromatic color pixel or a achromatic color pixel, and
    the first correction unit conducts different processing depending on whether the target pixel is a chromatic color pixel or an achromatic color pixel.

11. An image processing method for correcting image data corresponding to an edge area, comprising steps of:
    judging (a) whether a target pixel is in a first edge area by comparing an output from a differential filter with a first reference value, and (b) whether the target pixel is in a second edge area by comparing the output from a differential filter with a second reference value that is smaller than the first reference value;
    conducting (a) first correction processing on data of the target pixel that is judged to be in the first edge area, and (b) second correction processing on the target pixel that is judged to be in the second edge area; and
    wherein the data of each pixel includes a plurality of color component data;
    the first correction processing on at least one of the plurality of color component data is different from the other color component data; and
    the second correction processing on all of the color component data is performed in a same manner.

* * * * *